United States Patent
Kim

(10) Patent No.: US 7,864,779 B2
(45) Date of Patent: Jan. 4, 2011

(54) INTERNET SERVICE SYNCHRONIZATION METHOD FOR MOBILE COMMUNICATION TERMINAL

(75) Inventor: Min-Jeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1038 days.

(21) Appl. No.: 10/892,353

(22) Filed: Jul. 16, 2004

(65) Prior Publication Data

US 2005/0055448 A1 Mar. 10, 2005

(30) Foreign Application Priority Data

Jul. 18, 2003 (KR) .................. 10-2003-0049370

(51) Int. Cl.
*H04L 12/28* (2006.01)
(52) U.S. Cl. .................. 370/395.52; 709/203; 709/227
(58) Field of Classification Search ............ 370/395.52; 709/203, 207
See application file for complete search history.

(56) References Cited

U.S. PATENT DOCUMENTS

| | | | | |
|---|---|---|---|---|
| 5,721,920 A * | 2/1998 | Mak et al. ............... | 718/102 |
| 5,872,930 A * | 2/1999 | Masters et al. ........... | 709/223 |
| 6,172,605 B1 * | 1/2001 | Matsumoto et al. ....... | 340/500 |
| 6,366,947 B1 * | 4/2002 | Kavner .................. | 709/203 |
| 6,484,206 B2 * | 11/2002 | Crump et al. ............. | 709/227 |
| 6,553,237 B1 * | 4/2003 | Cantwell et al. .......... | 455/516 |
| 7,010,294 B1 * | 3/2006 | Pyotsia et al. ............ | 455/420 |
| 2002/0101819 A1 * | 8/2002 | Goldstone ............... | 370/229 |
| 2003/0050049 A1 * | 3/2003 | Sundstrom ............... | 455/414 |
| 2003/0072267 A1 | 4/2003 | Lohtia et al. | |
| 2003/0125023 A1 * | 7/2003 | Fishler .................. | 455/426 |
| 2003/0139191 A1 * | 7/2003 | Koo ..................... | 455/461 |
| 2003/0163508 A1 * | 8/2003 | Goodman ............... | 709/100 |
| 2005/0055448 A1 * | 3/2005 | Kim ..................... | 709/227 |

FOREIGN PATENT DOCUMENTS

| EP | 1 298 879 A2 | 4/2003 |
| EP | 1499086 A2 * | 1/2005 |
| EP | 1 298 879 A3 | 7/2005 |

OTHER PUBLICATIONS

Wireless Application Protocol (WAP) Forum, WAP Push Architectural Overview, Version Jul. 3, 2001, p. 8.*
(BB) Analysis of Evolution and Optimization Design of WAP Wireless Protocols; Gao Xin, Lü Wei-feng; May 2003; vol. 23, No. 5.
(CC) Chinese Office Action dated Feb. 15, 2008.
European Search Report dated Jul. 15, 2010.

* cited by examiner

*Primary Examiner*—Ricky Ngo
*Assistant Examiner*—Luat Phung
(74) *Attorney, Agent, or Firm*—Ked & Associates LLP

(57) ABSTRACT

A synchronization method between an application and Internet protocol included in a mobile terminal including determining whether or not an Internet Function can be performed by the Internet protocol and issuing a wait command from the Internet protocol to the application when it is determined the Internet function can not be performed so as to inform the application to wait a predetermined period of time before closing communication with the Internet protocol.

14 Claims, 5 Drawing Sheets

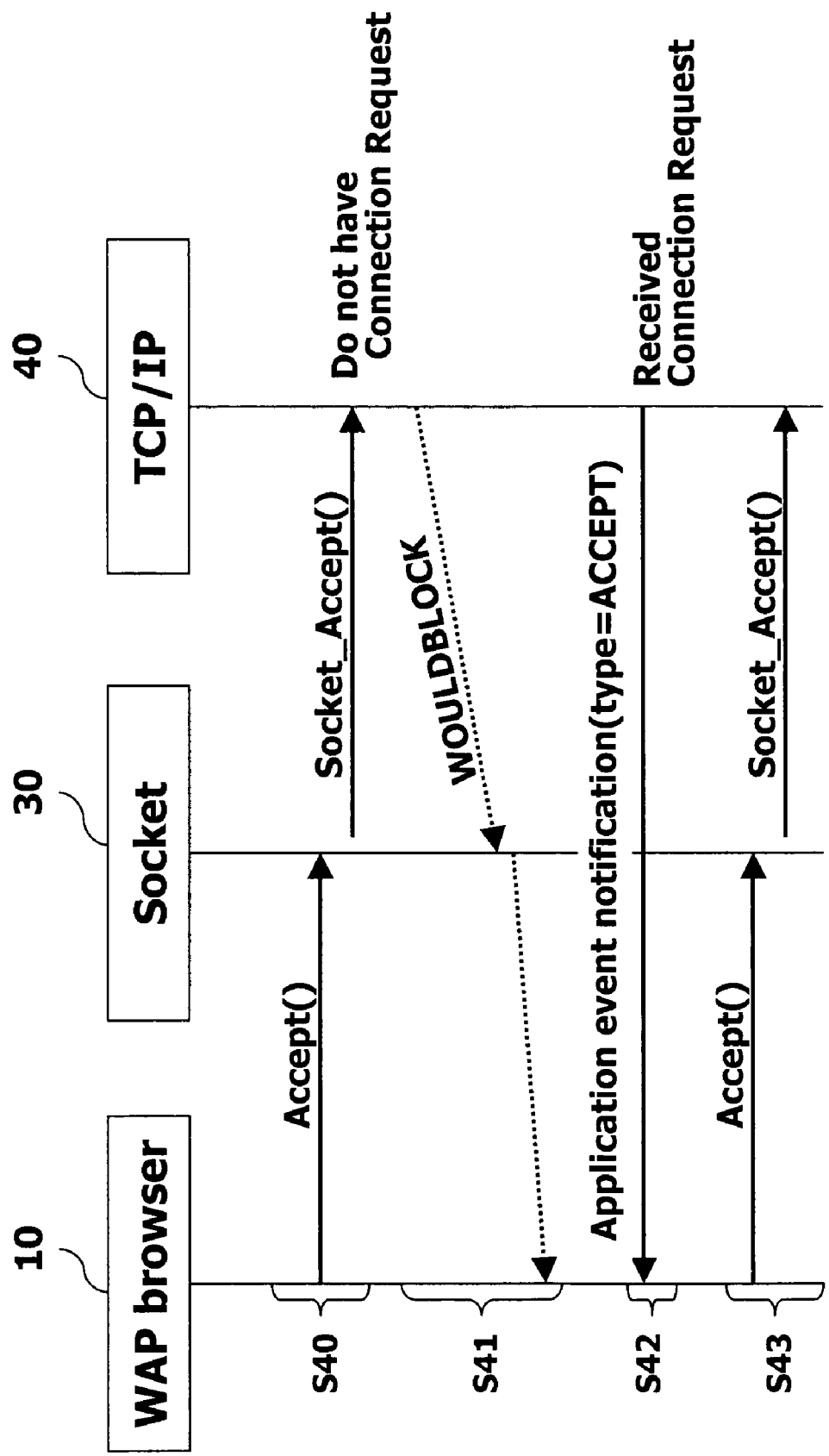

INTERNET SERVICE SYNCHRONIZATION METHOD FOR MOBILE COMMUNICATION TERMINAL

CROSS-REFERENCE TO A RELATED APPLICATION

This application claims priority to Korean Patent Application No. 49370/2003, filed on Jul. 18, 2003, the entire contents of which are hereby incorporated in its entirety.

BACKGROUND OF THE INVENTION

1. Field of the Invention

The present invention relates to an Internet service synchronization method for a mobile communication terminal, and more particularly to a method for synchronizing a Transmission Control Protocol/Internet Protocol (TCP/IP) and a Wireless Application Protocol (WAP) browser.

2. Background of the Related Art

A Wireless Application Protocol (WAP) is a protocol that allows a wireless communication device (such as a mobile terminal, a subscriber unit, a user equipment, a pager, a Personal Digital Assistant (PDA), etc.) access the Internet via Netscape Navigator or Microsoft Internet Explorer, for example. Thus, wireless networks including Global Standard for Mobiles (GSM), Time Division Multiple Access (TDMA), and Code Division Multiple Access (CDMA) wireless networks, for example, are able to access the Internet.

As noted above, the wireless communication device includes, for example, a mobile terminal, a pager, a PDA etc. For simplicity purposes, the wireless communication device as a mobile terminal will be discussed hereinafter.

Because the mobile terminal includes the WAP protocol, the user of the mobile terminal is able to download/receive multimedia from other services. The WAP protocol includes a WAP browser that interfaces with a Transmission Control Protocol/Internet Protocol (TCP/IP) to perform a variety of services. However, there are several problems in the interface between the TCP/IP and the WAP browser. For example, there are not any standards that effectively achieve a sufficient synchronization between the WAP browser and the TCP/IP. Thus, the user of the mobile terminal is not always able to successively access all of the functions provided by the WAP.

SUMMARY OF THE INVENTION

Accordingly, one object of the present invention is to at least address the above-noted and other problems.

Another object of the present invention is to reduce failures in the synchronization between the WAP browser and the TCP/IP.

To achieve at least the above and other objects in whole or in parts, the present invention provides a novel synchronization method between an application and Internet protocol included in a mobile terminal. The method includes determining whether or not an Internet Function can be performed by the Internet protocol and issuing a wait command from the Internet protocol to the application when it is determined the Internet function can not be performed so as to inform the application to wait a predetermined period of time before closing communication with the Internet protocol.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a flow diagram illustrating an example of a synchronization process for accepting a connection request of an external client according to the present invention.

BEST MODE OF THE INVENTION

Figure 1:
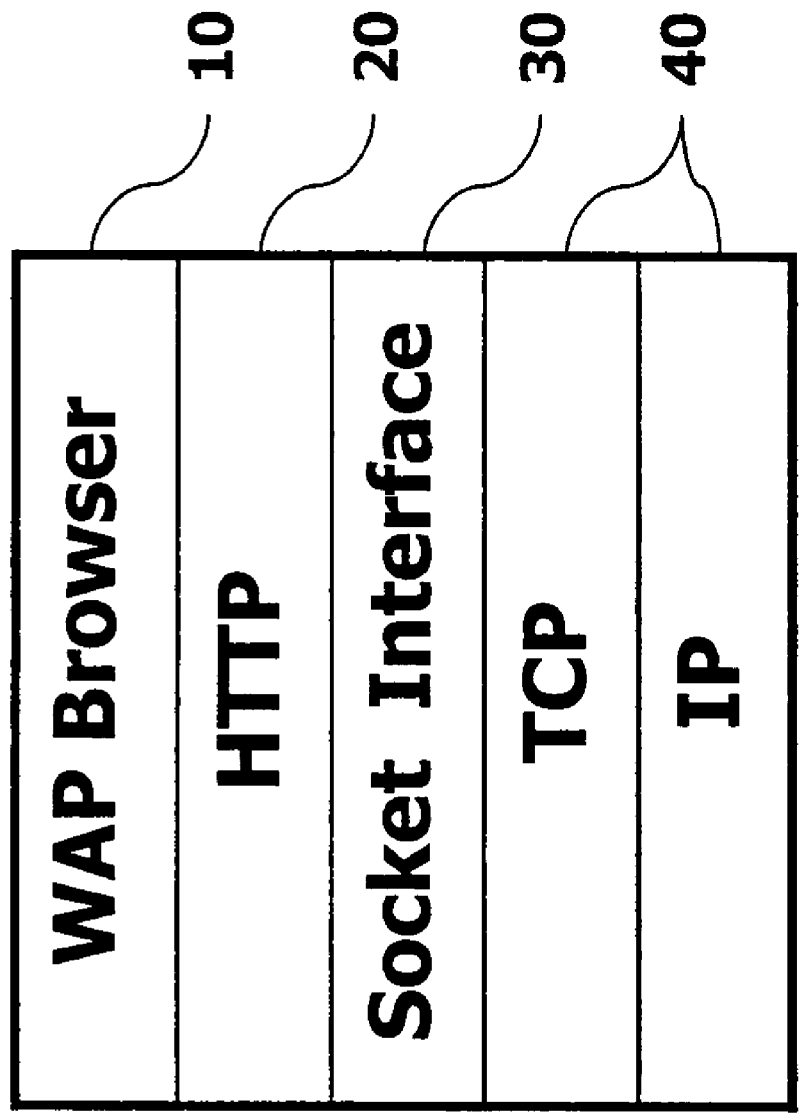
FIG. 1 is a layered model illustrating a protocol stack for the WAP.

Referring now to the drawings, wherein like reference numerals designate identical or corresponding parts throughout the several views, the present invention will be described.

As shown in FIG. 1, the WAP protocol stack includes a WAP browser 10, a HyperText Transfer Protocol (HTTP) 20, a socket interface 30 and a TCP/IP 40. Thus, the WAP browser layer 10 is able to communication with the TCP/IP layer 40 via the HTTP 20 and socket interface layer 30 to download/receive multimedia files, to search the Internet, etc.

In addition, the mobile terminal configured as a WAP device is included in a WAP based Internet system that includes a Contents Provider (CP) server for providing contents via the wireless network and a WAP gateway for providing a connection between the mobile terminal and the wireless Internet. Thus, the WAP device (e.g., mobile terminal) is able to receive data from Video on Demand (VOD), data from the Multimedia Messaging Service (MMS), and data using the File Transfer Protocol (FTP).

In more detail and with reference to FIG. 1, the WAP browser 10 provides an Internet service to a user through the socket interface 30 using the HTTP 20, and sets a connection with a network through the TCP/IP 40. The WAP browser 10 also transmits and receives data through the connection established with the network. A socket established in the socket interface 30 allows communication between a client program (e.g., the WAP browser 10) and a server program, and may be defined as an "end part of a connection." Such a socket is established using a series of programming requests that may be referred to as a socket Application Program Interface (API) or a Function call.

The different types of communication that occurs with the WAP browser 10 include, for example, data transmission, data reception and connection establishment.

When the WAP browser 10 requests data transmission using the TCP/IP 40, the TCP/IP 40 first determines whether or not a buffer space needed for the data transmission is available. In one example, if there is no available space in the buffer, the TCP/IP 40 returns a failure value indicating there is no space available in the buffer and the WAP browser 10 ends communication with the TCP/IP 40. In another example, when there is not enough space in the buffer to complete the data transmission request, the present invention advantageously notifies the WAP browser 10 (via the TCP/IP 40) to wait for the buffer space to become available (rather than ending the communication between the TCP/IP 40 and the WAP browser 10). This is particularly advantageous when the appropriate amount of buffer space becomes available shortly after the initial data transmission request (in which there was insufficient data space).

The data reception and connection establishment processes are handled in similar fashion. In more detail, when the WAP browser 10 requests data reception using the TCP/IP 40, the TCP/IP 40 determines whether or not the received data is in a buffer. Similar to above, in one example, if there is no received data, the TCP/IP 40 returns a failure value and the WAP browser 10 ends communication with the TCP/IP 40. Accordingly, in another example, the present invention advantageously notifies the WAP browser 10 (via the TCP/IP 40) to wait for the for the received data to be in the buffer (rather than ending the communication between the TCP/IP 40 and the WAP browser 10). This is particularly advantageous when the data is received in the buffer shortly after the initial data reception request (in which the data was not yet received).

In addition, to accept a connection request from an external client, the TCP/IP 40 first determines whether or not a "connection request signal" has been received. In one example, if it is determined the "connection request signal" has not been received, the TCP/IP 40 returns a failure value, and the WAP browser 10 ends communication with the TCP/IP 40. In another example, when the "connection request signal" has not yet been received, the present invention advantageously notifies the WAP browser 10 (via the TCP/IP 40) to wait for the "connection request signal" to become available (rather than ending the communication between the TCP/IP 40 and the WAP browser 10). This is particularly advantageous when the "connection request signal" becomes available shortly after the initial connection request (in which the "connection request signal has not been received).

Figure 2:
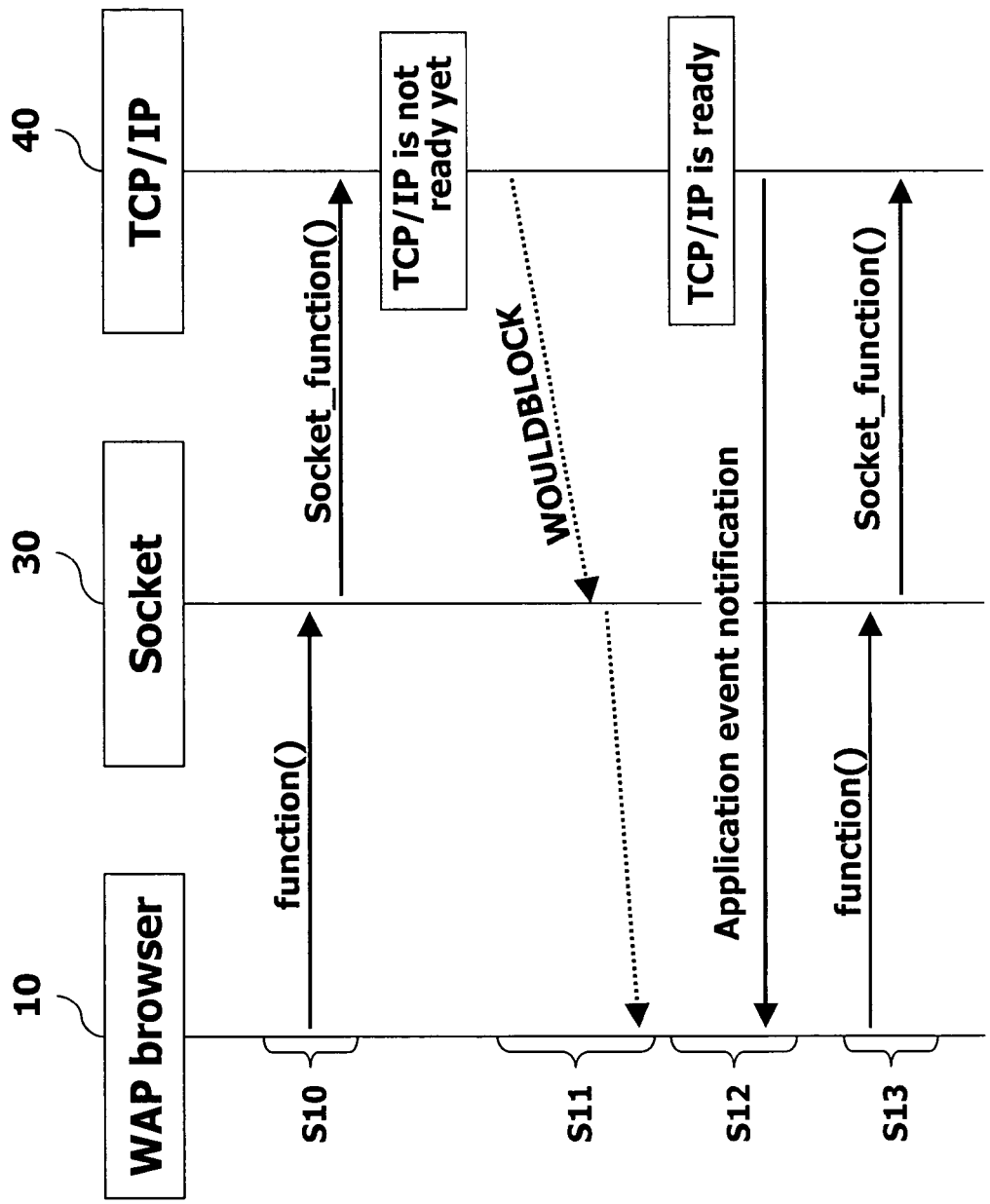
FIG. 2 is a flow diagram illustrating an example of a synchronization process according to the present invention.

Turning now to FIGS. 2-5, which illustrate the processes discussed above in more detail. First, FIG. 2 is a flow diagram illustrating an example of general Internet service synchronization process according to the present invention.

Figure 3:
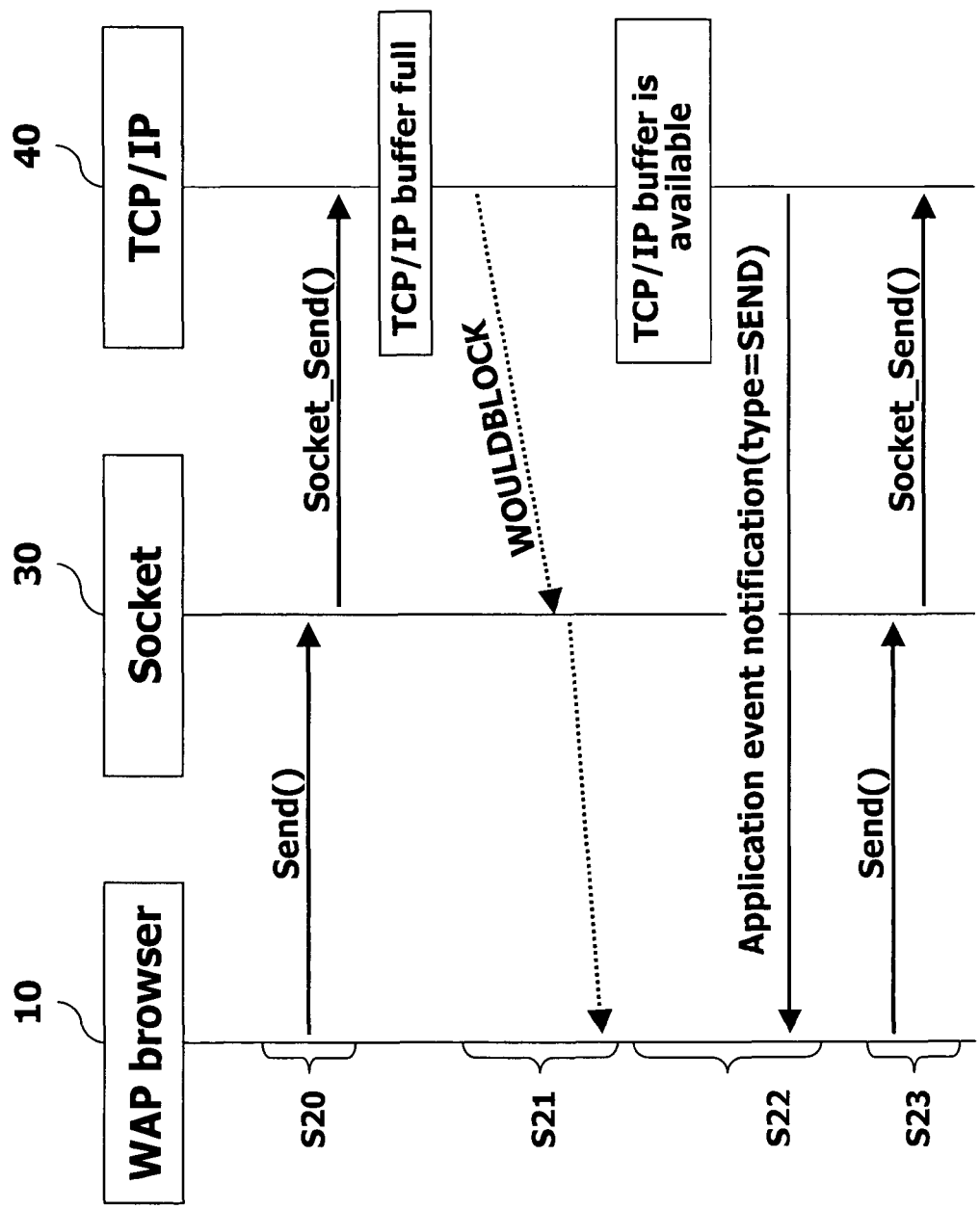
FIG. 3 is a flow diagram illustrating an example of a synchronization process for data transmission according to the present invention.

As shown, the Internet service synchronization includes the WAP browser 10 issues a function ( ) call using the HTTP 20, for example, and then the socket interface 30 issues a socket_function ( ) to establish a socket with the TCP/IP 40 (step S10). The socket may be established by using a socket API. Thus, a communication path has been established between the WAP browser 10 and the TCP/IP 40. If the function requested by the user cannot be processed by the TCP/IP 40, the TCP/IP 40 issues a command to the WAP browser 10 informing the WAP browser 10 to wait (rather than closing the communication path) (step S11). The issued command in this example is referred to as "WouldBlock." The WAP browser 10 then waits for a predetermined time (which can be set by the user, or wireless communication company, for example). As shown in FIG. 3, when the function requested by the user can be processed, the TCP/IP 40 issues a command to the WAP browser 10 indicating the same (step S12). This command may be referred to as an "Application Event Notification." Upon receiving the event notification, the WAP browser 10 resends the function ( ) call (step S13), and the Internet function is performed.

Next, FIG. 3 illustrates a synchronization process between the WAP browser 10 and the TCP/IP 40 when a user requests data transmission. As shown, when the user requests data transmission, the WAP browser 10 issues a send ( ) command using the HTTP 20, for example, to request data transmission, and then the socket interface 30 issues a socket_send ( ) command to establish a socket with the TCP/IP 40 (step S20). Thus, a communication path has been established between the WAP browser 10 and the TCP/IP 40. The TCP/IP 40 then determines if there is enough space available in a buffer to perform the requested data transmission (FIG. 3 illustrates that the data buffer is full).

In this example, because the data buffer is full and the requested data transmission can not be performed, the TCP/IP 40 issues a command to the WAP browser 10 informing the WAP browser 10 to wait (rather than closing the communication path) (step S21). The issued command in this example is also referred to as "WouldBlock." The WAP browser 10 then waits for a predetermined time (which can be set by the user, or wireless communication company, for example). As shown in FIG. 3, the TCP/IP 40 buffer is available, the TCP/IP 40 issues a command to the WAP browser 10 indicating the same (step S22). This command may be referred to as an "Application Event Notification (type=send)." Upon receiving the event notification, the WAP browser 10 reissues the send ( )call requesting the data transmission (step S23), and the requested function is performed.

Figure 4:
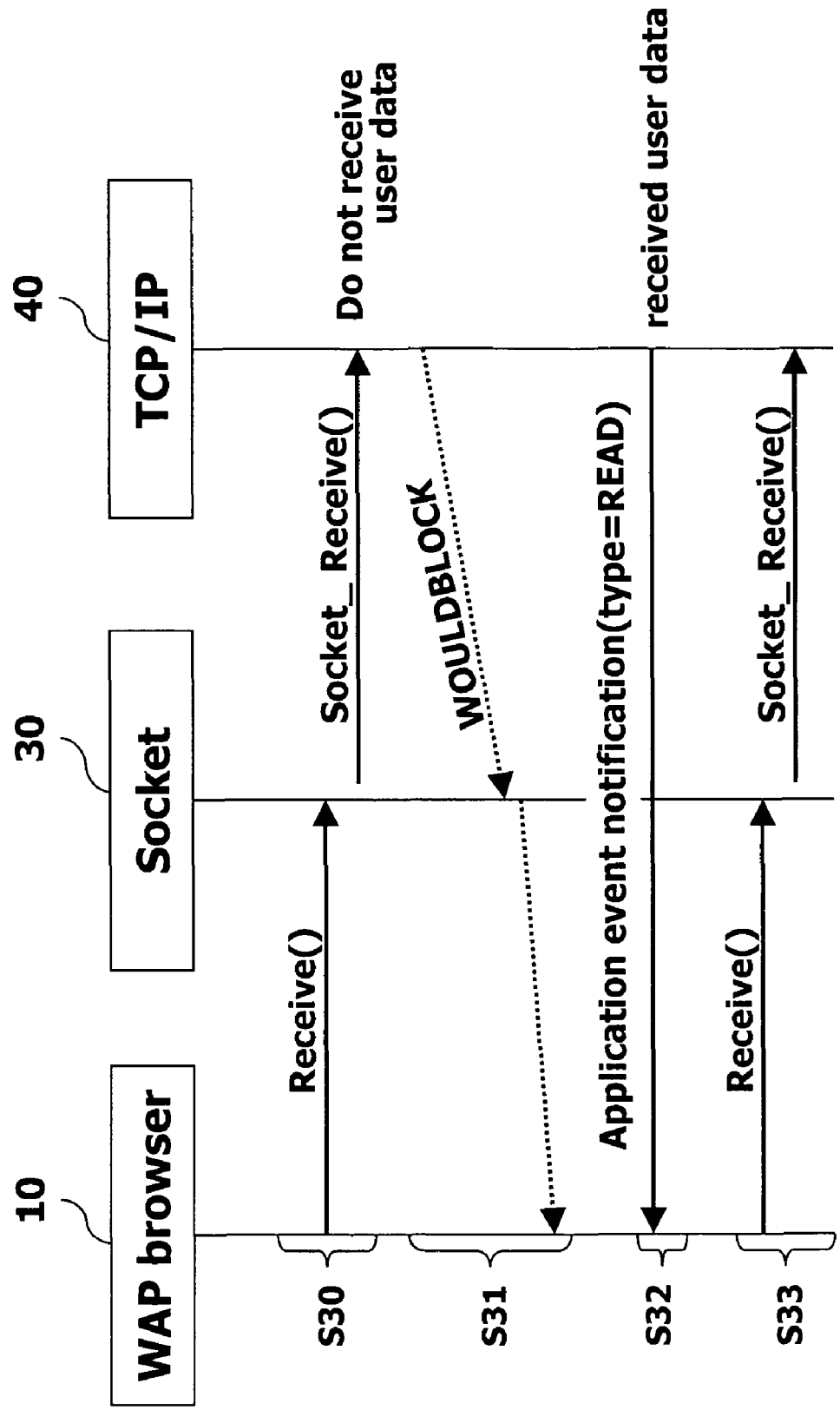
FIG. 4 is a flow diagram illustrating an example of a synchronization process for data reception according to the present invention.

Turning now to FIG. 4, which illustrates a synchronization process for data reception. As shown, when the user requests data reception, the WAP browser 10 issues a receive ( ) command using the HTTP 20, for example, to request data reception, and then the socket interface 30 issues a socket_receive ( ) command to establish a socket with the TCP/IP 40 (step S30). Thus, a communication path has been established between the WAP browser 10 and the TCP/IP 40. The TCP/IP 40 then determines if any data has been received from an external source (FIG. 4 illustrates that there is no received data).

In this example, because there is no data received and the data reception request can not be performed, the TCP/IP 40 issues a command to the WAP browser 10 informing the WAP browser 10 to wait (rather than closing the communication path) (step S31). The issued command in this example is also referred to as "WouldBlock." The WAP browser 10 then waits for a predetermined time (which can be set by the user, or wireless communication company, for example). As shown in FIG. 3, when the received data is available, the TCP/IP 40 issues a command to the WAP browser 10 indicating the same (step S32). This command may be referred to as an "Application Event Notification (type=read)." Upon receiving the event notification, the WAP browser 10 reissues the receive ( )call requesting the data reception (step S33), and the requested function is performed.

Next, FIG. 5 illustrates a synchronization process for accepting a connection request from an external client. As shown, when accepting a connection request, the WAP browser 10 issues an accept ( ) command using the HTTP 20, for example, for accepting the connection request, and then the socket interface 30 issues a socket_accept ( ) command to establish a socket with the TCP/IP 40 (step S40). Thus, a communication path has been established between the WAP browser 10 and the TCP/IP 40. The TCP/IP 40 then determines if a connection request signal has been received from an external source (FIG. 4 illustrates that there is no connection request).

In this example, because there is no connection request and acceptance of the connection request can not be performed, the TCP/IP 40 issues a command to the WAP browser 10 informing the WAP browser 10 to wait (rather than closing the communication path) (step S41). The issued command in this example is also referred to as "WouldBlock." The WAP browser 10 then waits for a predetermined time (which can be set by the user, or wireless communication company, for example). When the connection request is received from the external source, the TCP/IP 40 issues a command to the WAP browser 10 indicating the same (step S42). This command can be referred to as an "Application Event Notification (type=accept)." Upon receiving the event notification, the WAP browser 10 reissues the accept ( )command requesting acceptance of the connection request (step S43) and the connection is established.

Note that in the above examples, the WAP browser can perform other tasks while waiting for the even notification.

As so far described, the Internet service synchronization method according to the present invention significantly decreases synchronization failures by synchronizing the TCP/IP and the WAP browser.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A synchronization method between an application and Internet protocol included in a mobile terminal, the synchronization method comprising:

issuing an Internet function request from the application to the Internet protocol to request the Internet protocol perform data transmission, wherein the application comprises a Wireless Application Protocol (WAP) and the Internet protocol comprises a Transmission Control Protocol/Internet Protocol (TCP/IP);

determining whether an Internet function can be performed by the Internet protocol, wherein the Internet protocol determines whether there is a sufficient amount of space in a buffer of the mobile terminal to perform the request for data transmission;

issuing a wait command from the Internet protocol to the application when it is determined the Internet function can not be performed so as to inform the application to wait a predetermined period of time before closing communication with the Internet protocol;

issuing an event notification command from the Internet protocol to the application when it is determined the Internet function can be performed so that the application does not issue repetitively the Internet function request;

reissuing the Internet function request from the application to the Internet protocol to request the Internet protocol perform the Internet function; and performing at least one other task while waiting for an event notification.

2. The synchronization method of claim 1, further comprising:

performing the Internet function after receiving the reissued request.

3. The synchronization method of claim 1, wherein issuing the Internet function request comprises issuing a request for data reception.

4. The synchronization method of claim 3, wherein determining whether the Internet function can be performed comprises:

determining whether the Internet protocol has received data corresponding to the request for data reception.

5. The synchronization method of claim 1, wherein issuing the Internet function request comprises issuing a request for accepting a connection request from an external source.

6. The synchronization method of claim 5, wherein determining whether the Internet function can be performed comprises:

determining whether the Internet protocol has received the connection request from the external source.

7. A mobile terminal, comprising:

an application configured to request an Internet function that issues a request for data transmission; and an Internet protocol configured to determine whether the Internet function can be performed, and to issue a wait command to the application when it is determined the Internet function can not be performed so as to inform the application to wait a predetermined period of time before closing communication with the Internet protocol, wherein the Internet protocol determines whether there is a sufficient amount of space in a buffer of the mobile terminal to perform the request for data transmission, wherein the Internet protocol issues an event notification command to the application when it is determined the Internet function can be performed so that the application does not issue repetitively the Internet function request, wherein when the wait command is issued, the application can perform at least one other task while waiting for an event notification, wherein the application reissues the Internet function request to the Internet protocol after receiving the event notification from the Internet protocol to request the Internet protocol perform the Internet function, and wherein the application comprises a Wireless Application Protocol (WAP) and the Internet protocol comprises a Transmission Control Protocol/Internet Protocol (TCP/IP).

8. The mobile terminal of claim 7, wherein the Internet protocol performs the Internet function after receiving the reissued request.

9. The mobile terminal of claim 7, wherein the application issuing the Internet function requests issues a request for data reception.

10. The mobile terminal of claim 9, wherein the Internet protocol determining whether the Internet function can be performed determines whether the Internet protocol has received data corresponding to the request for data reception.

11. The mobile terminal of claim 7, wherein the application issuing the Internet function requests issues a request for accepting a connection request from an external source.

12. The mobile terminal of claim 11, wherein the Internet protocol determining whether the Internet function can be performed determines whether the Internet protocol has received the connection request from the external source.

13. A synchronization method between an application and an Internet protocol included in a mobile terminal, the synchronization method comprising:

requesting the Internet protocol perform an Internet function from the application to the Internet, comprising requesting data transmission, wherein the Internet protocol determines whether there is a sufficient amount of space in a buffer of the mobile terminal to perform the request for data transmission, and wherein the application comprises a Wireless Application Protocol (WAP) and the Internet protocol comprises a Transmission Control Protocol/Internet Protocol (TCP/IP);

trying to perform at least one of data transmission, data reception, and accepting connection request of an external client between the application and the Internet protocol; and performing at least one other task while waiting for an event notification.

14. A mobile terminal, comprising:

an Internet protocol configured to determine whether an Internet function can be performed when a request from an application for the Internet function is received, wherein the request from the application for the Internet function comprises a request for data transmission, wherein the Internet protocol determines whether there is a sufficient amount of space in a buffer of the mobile terminal to perform the request for data transmission; and an application configured to request the Internet function and perform at least one other task while waiting for confirmation from the Internet protocol, wherein the application comprises a Wireless Application Protocol (WAP) and the Internet protocol comprises a Transmission Control Protocol/Internet Protocol (TCP/IP).

* * * * *